Sept. 30, 1952            A. AUZIERE            2,611,942
DEVICE PERMITTING THE INTRODUCTION OF ADVERTISING
MATTER IN A PIECE OF TRANSPARENT SOAP
Filed Nov. 17, 1950

INVENTOR
ALBERT AUZIERE

BY:-

ATTORNEYS

Patented Sept. 30, 1952

2,611,942

UNITED STATES PATENT OFFICE 2,611,942

DEVICE PERMITTING THE INTRODUCTION OF ADVERTISING MATTER IN A PIECE OF TRANSPARENT SOAP

Albert Auzière, Marseille, France

Application November 17, 1950, Serial No. 196,228
In France November 24, 1949

1 Claim. (Cl. 25—106)

It has been attempted to use transparent soaps for publicity purposes, but the introduction of an object placed in the mass causes difficulties of manufacture.

Thus, it was generally necessary to divide the cake, dispose the object therein, and then stick the whole together again.

This resulted in slips, agglomerations of air and other traces which obscured the limpidity and, through the difficulties of handling, increased the manufacturing cost to a considerable extent.

The object of the invention consists of a device which permits the introduction of a display in a transparent cake of soap, without dividing the cake. It is characterised by the application of a dividing blade of special shape which, without separating the cake of soap into two parts, makes a recess and leaves a shape facilitating rejoining.

Furthermore, the extremity of this blade is provided with a sharp extension, which avoids the effects of vacuum after withdrawal, and eliminates all trace or obscurity in the surface.

In the annexed drawings, given by way of non-limiting example, of one of the forms of construction of the invention:

The dividing blade is constituted by a single thin rectangular metallic plate 1 with front cutting edges 2 and 3 and lateral cutting edges 4 and 5 to assist penetration into the cake of soap. The plate 1 has dimensions corresponding to the dimensions of the display member and forms an opening in the cake of soap of such size as to receive the display member therein.

It is provided with a single rectangular forward extension portion 6 integral with the plate and disposed centrally on the forward edge thereof to serve as a stop, said extension portion having its front edge sharpened to form a cutting edge to assist penetration thereof into the cake of soap.

It is mounted on an adjustable support (not shown) having an alternating movement of predetermined amplitude.

Figure 1:
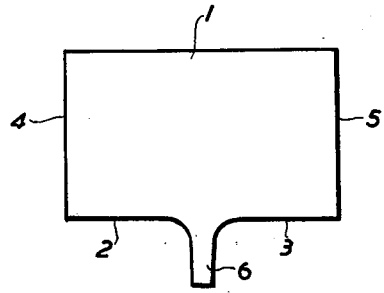
Figure 1 shows the blade seen in elevation.
Figure 2:
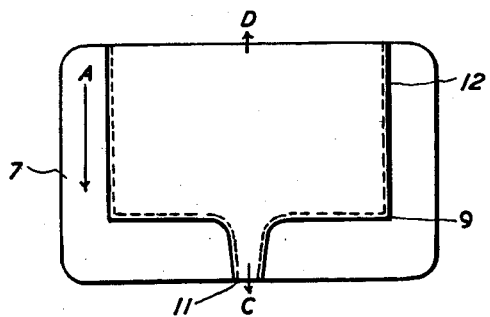
Figure 2 represents the introduction of the blade into the cake of soap.
Figure 3:
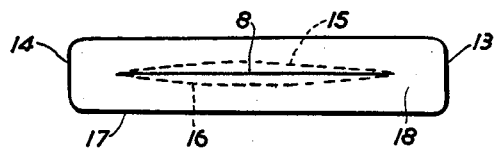
Fig. 3 shows a plan view corresponding to Fig. 2.

The functioning of this device can be seen. The raw cake of soap 7, Figure 2, is disposed in such a manner as to receive, in the medial part 8 of its upper surface, the metallic blade body 1, the edges 2 and 3 of which penetrate as far as the surface 9 corresponding to the base of the display 10.

When the blade reaches the end of its travel descending in the direction of the arrow A, the extension 6 will be flush with the base 11 of the cake of soap in such a manner as to make an opening thereat forming an air outlet through which air is expelled when the display member is inserted.

The extension 6 will likewise limit the amplitude of penetration of the blade into the cake of soap and will serve as a stop at the desired and predetermined level. Its withdrawal will be facilitated, and its sliding will produce absolutely no trace.

At this moment, there is introduced the display 10 which then abuts against the surface 9, the soap being lightly compressed on its surfaces 13 and 14 in order to open the lips 15 and 16 which immediately reclose on release of the cake of soap from such pressure.

The cake is then compressed to seal the lips 15 and 16.

The mouth of the joint formed by the parts 17 and 18 remaining intact, the evacuation of the air through the openings C and D will remove all bubbles or the like, in such a manner that the soap obtained will retain its transparency.

Figure 4:
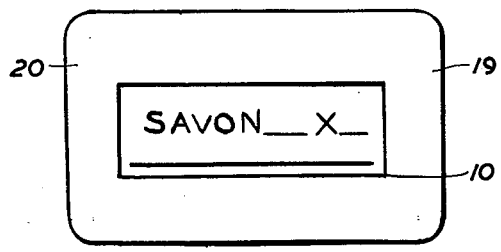
Fig. 4 is a view of the cake of soap after insertion of the display member.

The display will appear with complete clearness exactly as if it had been introduced in the mass at the time of manufacture, see Figure 4.

The piece of soap will remain in one piece and will no longer have need of centering to place the two portions symmetrically together.

As the cake is not at any time divided wholly into two parts no peripheral joining is required, and the cake will not split in two as a result of penetration of water, or blows.

I claim:

Cutter blade for partially dividing a cake of soap so as to permit the introduction thereinto of a display member, consisting of a single thin rectangular plate of dimensions corresponding to the dimensions of the display member and serving to form an opening in the cake of soap of such a size as to receive the display member therein, said plate having front and lateral sharpened cutting edges thereon to assist penetration of the plate into the cake of soap, and a single rectangular forward extension portion integral with the plate and disposed centrally on the forward edge thereof to serve as a stop limiting the penetration of the blade into the cake of soap, said extension having its front edge sharpened to form a cutting edge so as to penetrate completely through the cake of soap and form an air outlet therein through which the air is expelled when the display member is inserted.

ALBERT AUZIÈRE.

REFERENCES CITED

The following references are of record in the file of this patent:

UNITED STATES PATENTS

| Number | Name | Date |
|---|---|---|
| 500,856 | Brinkman | Mar. 22, 1898 |
| 1,190,742 | Emery | July 11, 1916 |
| 1,417,967 | Brookes | May 30, 1922 |
| 1,551,138 | De Corta | Aug. 25, 1925 |
| 1,578,198 | Lannert | Mar. 23, 1926 |
| 1,714,614 | Mumma et al. | May 28, 1929 |
| 1,973,092 | Mooney | Sept. 11, 1934 |

FOREIGN PATENTS

| Number | Country | Date |
|---|---|---|
| 535,762 | Germany | Oct. 26, 1931 |